United States Patent
Hattori

(10) Patent No.: US 7,623,161 B2
(45) Date of Patent: Nov. 24, 2009

(54) IMAGE PICKUP APPARATUS, WHITE BALANCE ADJUSTMENT METHOD THEREFOR, AND PROGRAM FOR IMPLEMENTING THE METHOD

(75) Inventor: Mitsuaki Hattori, Kanagawa (JP)

(73) Assignee: Canon Kabushiki Kaisha (JP)

( * ) Notice: Subject to any disclaimer, the term of this patent is extended or adjusted under 35 U.S.C. 154(b) by 908 days.

(21) Appl. No.: 10/980,541

(22) Filed: Nov. 3, 2004

(65) Prior Publication Data

US 2005/0099529 A1 May 12, 2005

(30) Foreign Application Priority Data

Nov. 6, 2003 (JP) .............................. 2003-377092

(51) Int. Cl.
H04N 9/73 (2006.01)
H04N 5/222 (2006.01)
G03B 15/03 (2006.01)

(52) U.S. Cl. ..................... 348/224.1; 396/159; 348/370
(58) Field of Classification Search .............. 348/223.1, 348/224.11, 370, 222.1, 225.1, 224.1, 227.1, 348/221.1, 371
See application file for complete search history.

(56) References Cited

U.S. PATENT DOCUMENTS 5,019,894 A * 5/1991 Hieda et al. ............... 348/224.1
5,568,194 A * 10/1996 Abe ......................... 348/223.1
5,617,139 A * 4/1997 Okino ....................... 348/223.1
6,529,235 B1 * 3/2003 Tseng ....................... 348/223.1
6,614,999 B2 * 9/2003 Hagiuda et al. ............. 396/155
6,693,673 B1 * 2/2004 Tanaka et al. .............. 348/371
7,158,174 B2 * 1/2007 Gindele et al. ........... 348/224.1

FOREIGN PATENT DOCUMENTS

JP 8-17498 B2 2/1996
JP 11313243 A * 11/1999

* cited by examiner

Primary Examiner—Nhan T Tran
Assistant Examiner—Ahmed A Berhan
(74) Attorney, Agent, or Firm—Rossi, Kimms & McDowell, LLP

(57) ABSTRACT

An image pickup apparatus which can carry out proper white balance adjustment even at the time of bounce flash shooting. A white balance adjusting circuit uses a first correction value calculated based on shot image data as a white balance correction value when it is detected that no light has been emitted from the light emitting device, and uses a second correction value for shooting with light emission as the white balance correction value when it is detected that light has been emitted from the light emitting device. The white balance adjusting circuit uses a third correction value different from the second correction value as the white balance correction value, when a white balance photography determining section detects that the bounce flash photography has been carried out.

9 Claims, 3 Drawing Sheets

IMAGE PICKUP APPARATUS, WHITE BALANCE ADJUSTMENT METHOD THEREFOR, AND PROGRAM FOR IMPLEMENTING THE METHOD

BACKGROUND OF THE INVENTION

1. Field of the Invention

The present invention relates to an image pickup apparatus, a white balance adjustment method therefor, and a program for implementing the method, and more particularly to an image pickup apparatus that can carry out bounce flash photography, and a white balance adjustment method therefor, and a program for implementing the method.

2. Description of the Related Art

Conventionally, to carry out white balance adjustment of a digital still camera, a TTL (through-the-lens) system has been frequently used. In the TTL system, light that has entered from the camera lens is photoelectrically converted by an image pickup device at the time of shooting, data roughly indicative of an achromatic color is extracted from image data obtained by the photoelectrically converted light, and R component and B component gains are calculated to convert the data into achromatic color data.

However, when this TTL system is used for shooting with electronic flash, various colors close to the color of the light source are contained in large amounts in the light from the object or no achromatic color is contained in the light, white balance adjustment is incorrectly carried out such that the color of the object becomes achromatic, for example.

To reduce such incorrect white balance adjustment even a little when electronic flash photography is carried out, achromatic color data is not extracted from image data obtained by photoelectrical conversion by the image pickup device at the time of shooting, but instead white balance adjustment is carried out using a white balance correction value corresponding to the light intensity of the electronic flash light (see Japanese Patent Publication (Kokoku) No. H08-17498, for example).

When this method is used, comparatively good white balance adjustment can be carried out if the electronic flash light is emitted directly onto the object.

However, at the time of electronic flash shooting, if bounce flash photography is carried out where the electronic flash irradiates light toward a white wall, for example, so that the light is indirectly irradiated onto the object, the light incident on the camera lens contains colors close to the color of light from the external light source which originally illuminated the object, in larger amounts than the color of the light from the electronic flash. Consequently, correction cannot be carried out correctly when white balance adjustment is performed using an electronic flash white balance correction value.

SUMMARY OF THE INVENTION

It is an object of the present invention to provide an image pickup apparatus and a white balance adjustment method therefor, which can carry out proper white balance adjustment even at the time of bounce flash shooting, and a program for implementing the method.

To attain the above object, in a first aspect of the present invention, there is provided an image pickup apparatus comprising a light emitting device, a light emission detecting device that detects whether light has been emitted from the light emitting device, a white balance adjusting device that carries out white balance adjustment of shot image data using a white balance correction value, the white balance adjusting device using a first correction value calculated based on the shot image data as the white balance correction value when the light emission detecting device detects that no light has been emitted from the light emitting device, and using a second correction value for shooting with light emission as the white balance correction value when the light emission detecting device detects that light has been emitted from the light emitting device, and a white balance photography detecting device that detects whether bounce flash photography has been carried out, when the light emission detecting device detects that light has been emitted from the light emitting device, wherein the white balance adjusting device uses a third correction value different from the second correction value as the white balance correction value, when the white balance photography detecting device detects that the bounce flash photography has been carried out.

Preferably, the third correction value is the first correction value.

Preferably, the third correction value is a value obtained by weighting the first correction value and a predetermined fourth correction value at a first predetermined ratio.

More preferably, the first predetermined ratio is determined based on a difference in luminance of an object between when light is emitted from the light emitting device and before light is emitted from the light emitting device.

Also preferably, the second correction value is the fourth correction value.

Preferably, the second correction value is a value obtained by weighting the fourth correction value and the first correction value at a second predetermined ratio which is higher than the first predetermined ratio.

To attain the above object, in a second aspect of the present invention, there is provided a white balance adjustment method for an image pickup apparatus, comprising a light emission detecting step of detecting whether light has been emitted from a light emitting device attached to the image pickup apparatus, a white balance adjusting step of carrying out white balance adjustment of shot image data using a white balance correction value, the white balance adjusting step using a first correction value calculated based on the shot image data as the white balance correction value when the light emission detecting step detects that no light has been emitted from the light emitting device, and using a second correction value for shooting with light emission as the white balance correction value when the light emission detecting step detects that light has been emitted from the light emitting device, and a white balance photography detecting step of detecting whether bounce flash photography has been carried out, when the light emission detecting step detects that light has been emitted from the light emitting device, wherein the white balance adjusting step uses a third correction value different from the second correction value as the white balance correction value, when the white balance photography detecting step detects that the bounce flash photography has been carried out.

To attain the above object, in a third aspect of the present invention, there is provided a program which causes a computer to execute the white balance adjustment method.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail below with reference to the accompanying drawings showing a preferred embodiment thereof.

Figure 1:
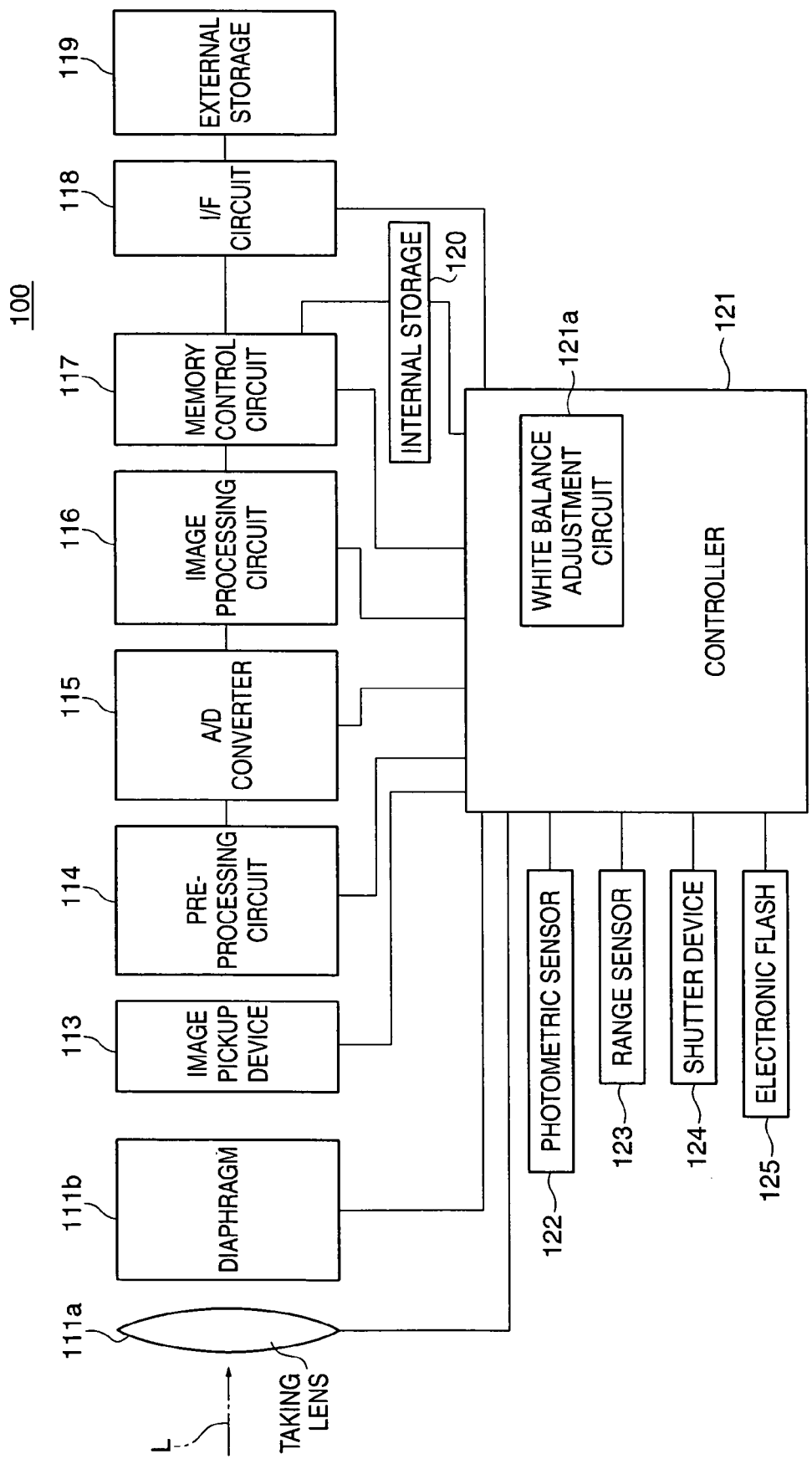
FIG. 1 is a block diagram schematically showing the construction of a digital still camera as an image pickup apparatus according to an embodiment of the present invention.

FIG. 1 is a block diagram schematically showing the construction of a digital still camera as an image pickup apparatus according to an embodiment of the present invention.

As shown in FIG. 1, a digital still camera 100 is comprised of a taking lens 111a, a diaphragm 111b, and an image pickup device 113, which are arranged such that object light L successively enters in the order mentioned, a preprocessing circuit 114 that preprocesses an image pickup image signal obtained by photoelectric conversion of incident object light L by the image pickup device 113, an A/D converter 115 that digitalizes the preprocessed signal, an image processing circuit 116 that carries out image processing on the image data digitalized by the A/D converter 115, an interface (I/F) circuit 118 that is connected to an external storage 119 such as a memory card, an internal storage 120, a memory control circuit 117 that stores the image data subjected to image processing by the image processing circuit 116 in the external storage 119 or the internal storage 120, a shutter (shutter device) 124, a photometric sensor 122 that outputs a light intensity signal corresponding to the luminance of reflected light from the object (hereinafter referred to as "object luminance"), a range sensor 123 that is implemented by a line sensor, not shown, such as a CCD or a C-MOS device and outputs an out-of-focus signal corresponding to the distance from the object, an externally attached or internal electronic flash 125 as a light emitting device, and a controller 121 that is connected to each of these components, has a computer function, and is comprised of a CPU, a memory, and other devices, not shown. The controller 121 controls the entire digital still camera 100 by the CPU reading out predetermined processing programs from the memory and executing the same.

The image pickup device 113, which is implemented by a fixed image pickup device such as a CCD (charge coupled device) or a C-MOS device, converts light that has entered via the diaphragm 111b into an electrical signal and outputs the same.

Preprocessing by the preprocessing circuit 114 includes noise removal processing by a CDS circuit, not shown, non-linear amplification processing, and so on. Image processing by the image processing circuit 116 includes image processing such as contour compensation and gamma correction.

Figure 2:
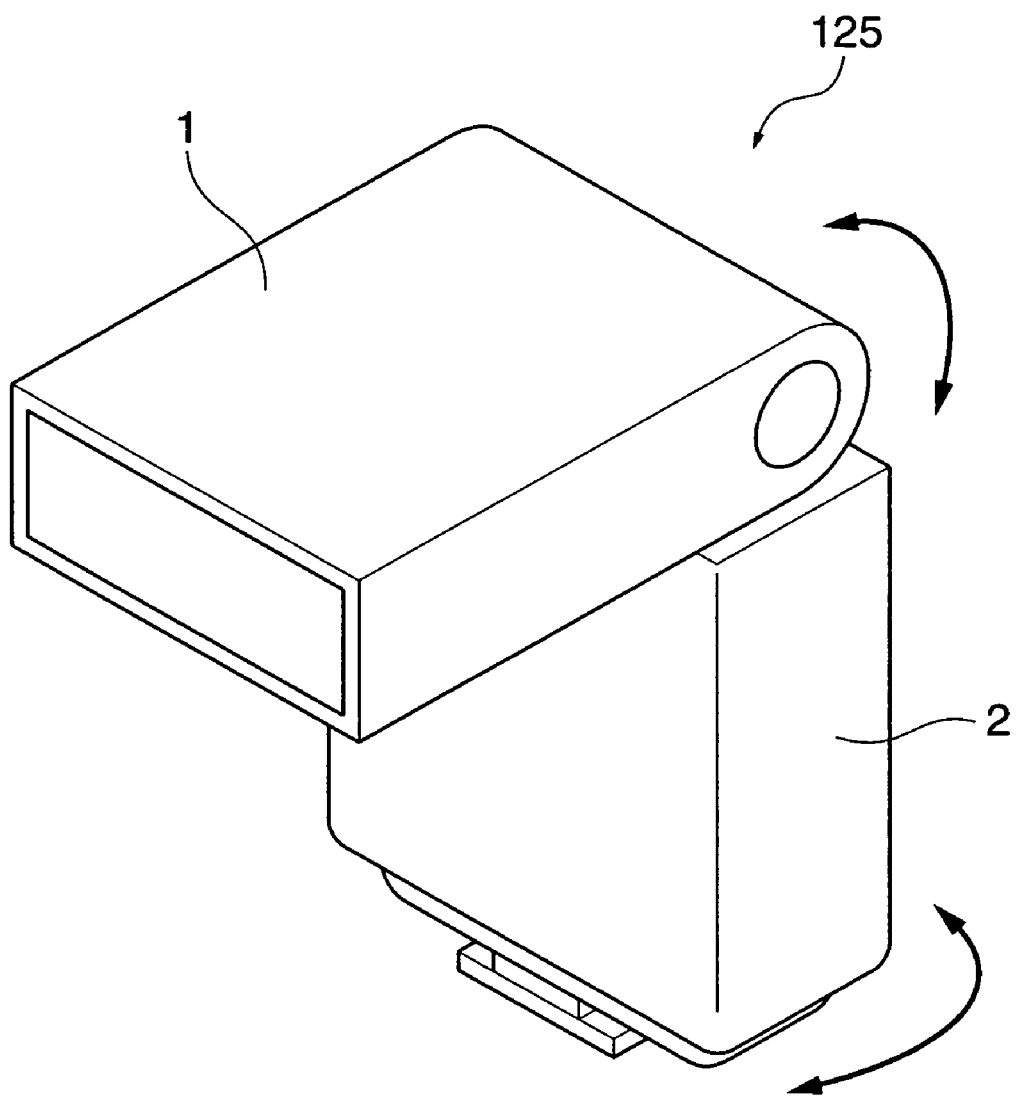
FIG. 2 is a perspective view showing the appearance of an electronic flash appearing in FIG. 1.

As shown in FIG. 2, the electronic flash 125 is composed of an electronic flash light emitting part 1 and a main body 2. The electronic flash light emitting part 1 is attached to the main body 2 so that it is rotatable about the vertical axis of the main body 2. The electronic flash light emitting part 1 is rotatable relative to the main body 2 from a normal position (the position shown in FIG. 2) by up to 90 degrees in the upper direction and by up to 7 degrees in the lower direction, and the irradiation direction can be changed within this range. Moreover, the electronic flash light emitting part 1 is rotatable from the normal position (position in FIG. 2) by up to ±180 degrees in the left and right directions, and the irradiation direction can be changed within this range. If the light emitting part 1 emits light at the time of shooting, the electronic flash 125 sends information indicative of the light emission and information indicative of the irradiation direction as electronic flash light emission information to the controller 121 at the time of shooting.

The controller 121 has an electronic flash photography determining section (electronic flash light emission detecting device), not shown, that if it receives the electronic flash light emission information at the time of shooting, determines that electronic flash photography has been carried out, and if it does not receive the electronic flash light emission information at the time of shooting, determines that electronic flash photography has not been carried out.

Moreover, the controller 121 has a bounce flash photography determining section (bounce flash photography detecting device), not shown, which determines whether or not bounce flash photography has been carried out, based on the irradiation direction information of the received electronic flash light emission information, when electronic flash photography is carried out. Specifically, when the irradiation direction information indicates the normal position or a direction lower than the normal position, the bounce flash photography determining section determines that bounce flash photography has not been carried out, and when the irradiation direction information indicates a direction higher than the normal position or a leftward or rightward direction than the normal position, then the bounce flash photography determining section determines that bounce flash photography has been carried out.

The controller 121 has a white balance adjustment circuit 121a (see FIG. 1). This white balance adjustment circuit 121a carries out an image data adjusting process, described later with reference to FIG. 3. Specifically, RGB data of each pixel that forms image data obtained from the A/D converter 115 is, for example, plotted in a predetermined color space such as an xy color space; R, G, and B components of the resulting data plotted on and in the vicinity of a black body radiation locus in the color space, which is highly likely to correspond to the light source color, are integrated; from the resulting integral values white balance correction values G/R and G/B for the R and B components are calculated; and the calculated white balance correction values are outputted to the image processing circuit 116. Based on the white balance correction values from the controller 121, the image processing circuit 116 performs white balance adjustment of the image data outputted from the A/D converter 115.

The digital still camera 100 constructed as described above operates as below, under the control of the controller 121.

First, a beam of light (object light) L from the object, not shown, is incident on the light-receiving face of the image pickup device 113 via the taking lens 111a and the diaphragm 111b.

At this time, the controller 121 determines a suitable exposure value to receive reflected light from the object, i.e. an exposure value suitable for photography, based on signal outputs from the photometric sensor 122 and the range sensor 123. The shutter speed of the shutter 124 is controlled so as to provide this exposure value. Also, the diaphragm value of the diaphragm 111*b* is controlled so as to provide this exposure value.

In the present embodiment, the photometric sensor 122 is disposed separately from the optical axis of the taking lens 111*a*. However, this is not limitative, and a TTL system structure may be employed, in which the photometric sensor 122 is formed coaxially with the optical axis of the taking lens 111*a*. Also, the method to obtain the white balance correction value is not limited to the above described method and any desired method or a further complex method is applicable.

Figure 3:
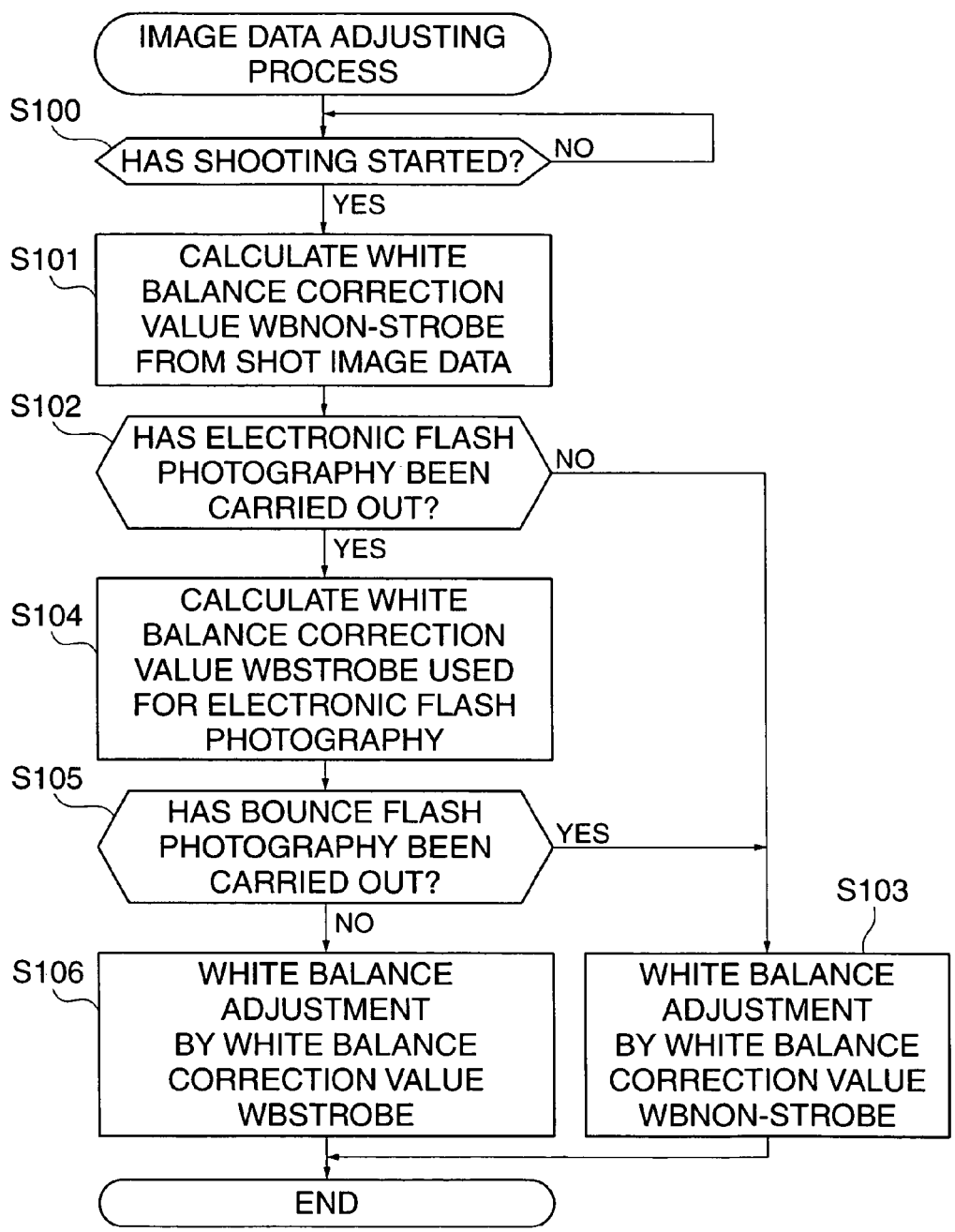
FIG. 3 is a flowchart showing the procedure of an image data adjusting process carried out by a controller appearing in FIG. 1.

FIG. 3 is a flowchart showing the procedure of the image data adjustment process carried out by the controller 121 in FIG. 1.

In FIG. 3, when shooting is started (yes to a step S100), first the white balance adjustment circuit 121*a* of the controller 121 extracts color components on and in the vicinity of the black body radiation locus from image data (shot image data) outputted from the A/D converter 115, using the predetermined color space such as the xy color space. The white balance adjustment circuit 121*a* calculates a white balance correction value WBnon-strobe (white balance correction values G/R and G/B for R and B components applied to non-electronic flash photography) to such a value as converts an average color of the extracted color components into an achromatic color (step S101).

Next, the electronic flash photography determining section of the controller 121 determines whether or not the shooting that has been carried out is electronic flash photography (step S102). Specifically, the electronic flash photography determining section determines that the shooting is electronic flash photography, when the electronic flash light emission information is sent to the controller 121 from the electronic flash 125 at the time shooting. When the result of the determination in the step S102 is not electronic flash photography, white balance adjustment of the shot image data is carried out using the white balance correction value WBnon-strobe (first correction value) calculated in the step S101 (step S103), and then the present process is terminated.

On the other hand, when the result of the determination in the step S102 is that the shooting is electronic flash photography (yes to the step 102), a white balance correction value WBstrobe (second correction value; white balance correction values G/R and G/B for R and B components applied to electronic flash photography) for electronic flash photography is calculated (step S104).

According to the processing of the steps S101, S102, and S104, when the photography is electronic flash photography (yes to the step S102), not only is the white balance correction value WBnon-strobe calculated (step S101), but additionally the white balance correction value WBstrobe for electronic flash photography is also calculated (step S104). Therefore, at the time of electronic flash shooting, the influence of the light source colors of both the light source that originally illuminated the object and the emitted electronic flash light can be taken into account.

The white balance correction value WBstrobe for electronic flash photography is either a white balance correction value WBset (fourth correction value) that is preset in the memory, not shown, of the controller 121, or a mixed value obtained by mixing the above-mentioned calculated white balance correction value WBnon-strobe and the above-mentioned white balance correction value WBset at a predetermined MIX ratio α.

The MIX ratio α is determined based on a difference between a value of the luminance of the object before the electronic flash 125 emits light and a value of the same when it emits light, the values being contained in information on the luminance of the object which the controller 121 receives from the photometric sensor 122 which detects light emitted by the electronic flash 125 before it emits light and when it emits light. Specifically, the MIX ratio α is set such that the weight of the while balance correction value for electronic flash photography becomes larger as the amount by which the luminance of the object when the electronic flash emits light is higher than that before it emits light increases. This is based on the recognition that the greater the difference in object luminance between when the electronic flash emits light and before it emits light, the greater the influence of the electronic flash light upon the object.

The white balance correction value WBstrobe is actually calculated using the following formula.

$$WBstrobe = WBset \times \alpha + WBnon\text{-}strobe \times (1-\alpha)$$

Here, α represents the MIX ratio ($0 \leq \alpha \leq 1$) applied at the time of electronic flash shooting.

Referring again to FIG. 3, after the execution of the step S104, the bounce flash photography determining section of the controller 121 determines whether or not the shooting is bounce flash photography (step S105). Specifically, when the information on the irradiation direction of the electronic flash light emission part 1 contained in the received electronic flash light emission information indicates the normal position (FIG. 2) or a position lower than the normal position the bounce flash photography determining section determines that the shooting is not bounce flash photography. When the irradiation direction information indicates a direction higher than the normal position or a leftward or rightward direction than the normal position, the bounce flash photography section determines that the shooting is bounce flash photography.

When it is determined in the step S105 that the shooting is not bounce flash photography, white balance adjustment of the shot image data is carried out using the white balance correction value WBstrobe calculated in the step S104 (step S106). On the other hand, when it is determined in the step S105 that the shooting is bounce flash photography, white balance adjustment of the shot image data is carried out using the white balance correction value WBnon-strobe calculated in the step S101 as a bounce flash photography white balance correction value WBbounce (third correction value) (step S103), followed by the present process being terminated.

According to the present process, when the shooting is electronic flash photography (yes to the step S102) and bounce flash photography (yes to the step S105), white balance adjustment is carried out using the white balance correction value WBnon-strobe calculated based on shot image data and not using the white balance correction value Wbstrobe for electronic flash photography (step S103). As a result, even when bounce flash photography is carried out, where electronic flash light reflected from a wall or the like is indirectly irradiated onto the object and hence the luminance of the object is quite different to the luminance of the object when the object is directly irradiated with electronic flash light, white balance can be properly adjusted.

More specifically, comparing between the case where electronic flash photography that has been carried out (yes to the step S102) is bounce flash photography (yes to the step S105), and the case where the electronic flash photography that has been carried out is not bounce flash photography (no to the step S105), the light source color that originally illuminated the object is more likely to remain on the shot image data when bounce flash photography has been carried out, and consequently, if white balance adjustment of the image data obtained by bounce flash photography is carried out using the electronic flash photography white balance correction value WBstrobe, the influence of the light source that illuminated the object cannot be sufficiently removed.

In the present embodiment, as described above, at the time of bounce flash shooting, white balance adjustment is performed using the white balance correction value WBnonstrobe. However, the present invention is not limited to this insofar as the while balance adjustment is carried out using different white balance correction values for non-bounce flash electronic flash photography and bounce flash photography, respectively. For example, the white balance correction value WBbounce flash for bounce flash photography may be calculated using the formula below.

$$WBbounce = WBset \times \beta + WBnon\text{-}strobe \times (1-\beta)$$

Here, $\beta$ represents the MIX ratio ($0 \leq \beta < \alpha$) applied at the time of bounce flash shooting. Specifically, the MIX ratio $\beta$ is determined based on a difference between a value of the luminance of the object before the electronic flash 125 emits light and a value of the same when it emits light, the values being contained in information on the luminance of the object which the controller 121 receives from the photometric sensor 122 which detects light emitted by the electronic flash 125 before it emits light and when it emits light.

Moreover, at the time of electronic flash photography, white balance adjustment may be performed using previously calculated different correction values for the case where bounce flash photography has not been carried out and the case where bounce flash photography has been carried out, respectively.

It is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be supplied by downloading from another computer, a database, or the like, not shown, connected to the Internet, a commercial network, a local area network, or the like.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

CROSS REFERENCE TO RELATED APPLICATION

This application claims priority from Japanese Patent Application No. 2003-377092 filed Nov. 6, 2003, which is hereby incorporated by reference herein.

What is claimed is:

1. An image pickup apparatus comprising:
   a light emitting device;
   a light emission detecting device that detects whether light has been emitted from said light emitting device;
   a white balance adjusting device that carries out a white balance adjustment of shot image data using a white balance correction value;
   wherein said white balance adjusting device applies a first correction value calculated based on the shot image data as the white balance correction value when said light emission detecting device detects that no light has been emitted from said light emitting device, and applies a second correction value for shooting with light emission as the white balance correction value when said light emission detecting device detects that light has been emitted from said light emitting device, and
   wherein the second correction value is a value obtained by weighting the first correction value and a fourth correction value different from the first correction value for shooting with light emission stored in a memory; and
   a white balance photography detecting device that detects whether a bounce flash photography has been carried out, when said light emission detecting device detects that light has been emitted from said light emitting device,
   wherein said white balance adjusting device applies a third correction value different from the second correction value as the white balance correction value, when said white balance photography detecting device detects that the bounce flash photography has been carried out,
   wherein the third correction value is a value obtained by weighting the first correction value and the fourth correction for shooting with light emission value at a first predetermined ratio.

2. An image pickup apparatus as claimed in claim 1, wherein the first predetermined ratio is determined based on a difference in luminance of an object between when light is emitted from said light emitting device and before light is emitted from said light emitting device.

3. An image pickup apparatus as claimed in claim 1, wherein the first correction value and the fourth correction value are weighted at a second predetermined ratio, which is higher than the first predetermined ratio, to obtain the second correction value.

4. A white balance adjustment method for an image pickup apparatus, comprising:
   a light emission detecting step of detecting whether light has been emitted from a light emitting device attached to the image pickup apparatus;
   a white balance adjusting step of carrying out a white balance adjustment of shot image data using a white balance correction value;
   wherein said white balance adjusting step applies a first correction value calculated based on the shot image data as the white balance correction value when said light emission detecting step detects that no light has been emitted from the light emitting device, and applies a second correction value for shooting with light emission as the white balance correction value when said light emission detecting step detects that light has been emitted from the light emitting device, wherein the second correction value is a value obtained by weighting the first correction value and a fourth correction value different from the first correction value for shooting with light emission stored in a memory; and a white balance photography detecting step of detecting whether a bounce flash photography has been carried out, when said light emission detecting step detects that light has been emitted from the light emitting device, wherein said white balance adjusting step applies a third correction value different from the second correction value as the white balance correction value, when said white balance photography detecting step detects that the bounce flash photography has been carried out, wherein the third correction value is a value obtained by weighting the first correction value and the fourth correction value for shooting with light emission at a first predetermined ratio.

5. A white balance adjustment method as claimed in claim 4, wherein the first predetermined ratio is determined based on a difference in luminance of an object between when light is emitted from the light emitting device and before light is emitted from the light emitting device.

6. A white balance adjustment method as claimed in claim 4, wherein the first correction value and the fourth correction value are weighted at a second predetermined ratio, which is higher than the first predetermined ratio, to obtain the second correction value.

7. A computer-readable medium storing a computer program for adjusting a white balance for an image pickup apparatus, the computer program comprising:

a light emission detecting instruction for detecting whether light has been emitted from a light emitting device attached to the image pickup apparatus;

a white balance adjusting instruction for carrying out a white balance adjustment of shot image data using a white balance correction value;

wherein said white balance adjusting instruction includes applying a first correction value calculated based on the shot image data as the white balance correction value when said light emission detecting instruction detects that no light has been emitted from the light emitting device, and applying a second correction value for shooting with light emission as the white balance correction value when said light emission detecting instruction detects that light has been emitted from the light emitting device, wherein the second correction value is a value obtained by weighting the first correction value and a fourth correction value different from the first correction value for shooting with light emission stored in a memory; and a white balance photography detecting instruction for detecting whether a bounce flash photography has been carried out, when said light emission detecting instruction detects that light has been emitted from the light emitting device, wherein said white balance adjusting instruction includes applying a third correction value different from the second correction value as the white balance correction value, when said white balance photography detecting instructions detects that the bounce flash photography has been carried out, wherein the third correction value is a value obtained by weighting the first correction value and the fourth correction value for shooting with light emission at a first predetermined ratio.

8. A computer-readable medium as claimed in claim 7, wherein the first predetermined ratio is determined based on a difference in luminance of an object between when light is emitted from the light emitting device and before light is emitted from the light emitting device.

9. A computer-readable medium as claimed in claim 7, wherein the first correction value and the fourth correction value are weighted at a second predetermined ratio, which is higher than the first predetermined ratio, to obtain the second correction value.

* * * * *